(12) United States Patent
Hoffman

(10) Patent No.: US 6,207,242 B1
(45) Date of Patent: *Mar. 27, 2001

(54) LAMINATED PACKAGE WITH ENHANCED INTERIOR AND EXTERIOR

(75) Inventor: Roger P. Hoffman, Green Bay, WI (US)

(73) Assignee: Hoffman Environmental System, Inc., Green Bay, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/126,210

(22) Filed: Jul. 30, 1998

Related U.S. Application Data

(63) Continuation-in-part of application No. 08/579,219, filed on Dec. 28, 1995, now Pat. No. 5,882,746.

(51) Int. Cl.[7] .................................................. B65D 5/42
(52) U.S. Cl. ..................... 428/34.2; 428/195; 428/198; 428/200; 428/330; 428/903.3; 229/5.81; 229/5.84; 156/256; 156/277
(58) Field of Search ........................... 428/34.2, 195, 428/198, 200, 330, 337, 339, 535, 537.5, 689, 903.3; 229/5.81, 5.84; 156/250, 277, 256

(56) References Cited

U.S. PATENT DOCUMENTS

| | | | |
|---|---|---|---|
| 4,543,280 | * 9/1985 | Fujita et al. | 428/34.2 |
| 4,595,611 | * 6/1986 | Quick et al. | 428/34.2 |
| 4,828,164 | * 5/1989 | Passamoni | 229/102.5 |
| 5,038,997 | * 8/1991 | St. Charles | 229/5.81 |
| 5,217,765 | * 6/1993 | Parks | 428/34.2 |
| 5,415,340 | * 5/1995 | Calvert et al. | 229/5.84 |
| 5,458,723 | * 10/1995 | Watkins et al. | 156/310 |
| 5,506,011 | * 4/1996 | Farrell et al. | 428/34.2 |
| 5,882,746 | * 3/1999 | Hoffman | 428/34.2 |

* cited by examiner

Primary Examiner—Rena L. Dye
(74) Attorney, Agent, or Firm—Philip M. Weiss, Esq.; Weiss & Weiss, PC

(57) ABSTRACT

A laminated paperboard package is produced by initially printing graphics by high speed printing on a sheet of clay-coated publication paper. The printed paper is then continuously bonded to a surface of cellulosic base layer, to provide a laminated product. The cellulosic base layer consists of at least one base ply of unbleached fibers and at least one ply of bleached or dyed fibers. Alternatively, instead of a ply of bleached or dyed fibers, a second layer of paper may be laminated to the base ply. The laminated product is then die cut to the desired shape, folded and glued into the configuration of a box or container. The substrate may be either coated, or a ply is provided, to prevent moisture or oil from the contained product from seeping through the base layer to the printed paper.

49 Claims, 2 Drawing Sheets

LAMINATED PACKAGE WITH ENHANCED INTERIOR AND EXTERIOR

CROSS REFERENCE TO RELATED APPLICATION

This application is a continuation-in-part of Ser. No. 08/579,219 filed Dec. 28, 1995 now U.S. Pat. No. 5,882,746.

BACKGROUND OF THE INVENTION

In recent years with the advent of mega-retailers and mass merchandizing, packaging has rapidly evolved. Today, more than ever, packaging is an extension of the marketing effort.

When marketing products such as food, facial tissue, medicine, bandages, clothing, collectible figurines and the like, it is important that the interior of the product package appears clean and/or refined, or even decorative so as to impart an appearance of cleanliness or high value. High quality graphics on the exterior of a package also impart an image of quality. In certain competitive markets, product differentiation through enhanced printed graphics on the package exterior is critical.

In the paper industry, the term "paperboard" or "fiberboard" is generally considered to fall into two broad categories, containerboard and boxboard. Containerboard is used to make corrugated containers and include corrugating medium and linerboard, whereas boxboard is used to make folding cartons such as boxes, and the like. However, it has been recognized that sharp, precise graphics cannot be obtained when printing directly on either of these paperboard products due to the fact that the paperboard printing surface is relatively rough or uneven, as compared with clay coated paper. Further, paperboard normally has a grey or brown color, and printing directly on the darker color of the paperboard will tend to distract from the resolution of the graphs.

In order to achieve a paperboard package with an apparent sanitary or high quality interior, many manufacturers use a paperboard product that contains all bleached fibers and/or clay-coated exteriors. Examples of these packages include: solid-bleached kraft cartons and solid bleached cartons with a clay coating. However, there are detriments to using bleached fibers and clay-coatings in packaging.

In packaging, bleached fibers are a detriment for several reasons. First, it costs more to make bleached pulp. Second, paper made from bleached pulps is weaker than that made from unbleached pulps. In order to bleach wood fibers, a great majority of the lignin must be removed. However, the bleaching process not only removes lignin, but also removes desirable materials such as cellulose and hemicellulose which attribute strength to the paper. This loss of strength is also the result of the cellulose being damaged by the more severe pulping conditions necessary for bleaching. Additionally, the hemicellulose that contributes to pulp stiffness is almost completely absent in bleached pulp. Third, bleached pulps are more dense. Therefore, they have a lower caliper and thus, a lower stiffness for a given basis weight. The stiffer the board, the better its stacking performance will be. Finally, bleaching pulp has significant environmental consequences. The production of chlorine bleached pulp has been shown to produce dioxins and other undesirable air and water emissions.

Clay-coated board is also detrimental for several reasons. First, it is expensive to produce and transport the clay coated paperboard from which beverage carriers are made. For example, there are significant fixed capital and variable expenditures associated with the equipment and process necessary for clay-coated board production. Such expenditures include additional drying equipment, clay applicators and special production facilities. Second, due to the relatively rough surface of the coated paperboard, the printed graphics do not have the fine or sharp resolution compared to graphics printed on publication grade paper. Third, a problem in printing of the clay-coated paperboard is that it cannot be printed at high speeds, even though it can be printed on web presses. Thus, cost per carton is expensive and the quality moderate by comparison to publication grade paper. Finally, the logistics of handling heavy boards through the printing process and commerce means moving greater tonnage to create the final product.

In general, producing fiberboard that is smooth or bright enough for printing purposes is detrimental for two reasons. First, additional costs result from using higher contents of expensive, high quality pulp and high-end papermaking processes. Second, higher caliper boards must be used to compensate for the loss of strength and stiffness caused by manufacturing processes used to achieve high quality fiberboard. This results in increased product and shipping costs.

Thus, there exists a distinct market for competitively priced paperboard packaging that is environmentally friendly, and has enhanced stiffness, strength, graphics and a white interior.

BRIEF DESCRIPTION OF THE DRAWINGS

The drawings illustrate the best mode presently contemplated of carrying out the invention.

In the drawings.

SUMMARY OF THE INVENTION

Figure 1:
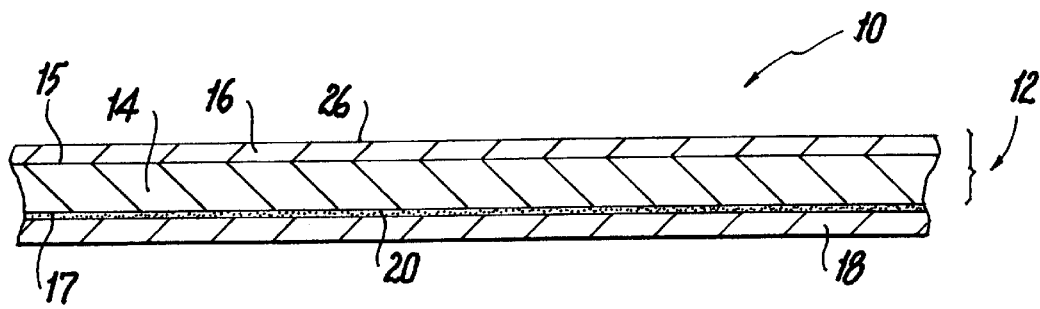
FIG. 1 is a cross-sectional view of one embodiment of the laminate of the present invention wherein the unbleached surface of the base layer has an outer layer adhesively attached thereto.

The invention is directed to a laminated paperboard package, particularly a folding carton, having enhanced graphics on its exterior and a bleached, colored or laminated interior, with or without printed graphics, and to a method of producing the same.

In accordance with the invention, a sheet of clay-coated kraft or publication paper, or super calendared publication paper, is printed with graphics, preferably by a high-speed web offset printer. The printed paper is then laminated to a surface of a cellulosic substrate having a bleached exterior ply on the opposite surface. The cellulosic substrate can be formed of one or more plies of recycled fibers or unbleached virgin fibers and the exterior ply of bleached fiber will be formed from bleached recycled or virgin pulp. Alternatively, the bleached exterior ply may be replaced by a colored, or laminated surface. Dyed, recycled or virgin pulp would be used to achieve the colored surface, and a paper would be used for the laminate.

Unless directly laminated in an in-line process, the printed paper is wound in coil form and stored for subsequent lamination. Thus, the paper may be printed at a central location and shipped to various box manufacturing sites. At the box manufacturing site the coiled printed paper is unwound and continuously applied to a surface of the moving cellulosic substrate, and bonded to the substrate by an adhesive to provide a laminated product. This adhesive can be of many different varieties including: wet-bond or dry-bond adhesive polyethylene; hydrolyzed starch; hot melt.

Preferably, printed publication paper is used, yet the printed publication paper is relatively translucent. As the thin layer of adhesive may also be relatively translucent, the dark colored cellulosic substrate may show through the printed paper, thus detracting from the appearance of the graphics. To prevent "show-through," finely divided particles of a generally inert white pigment, such as calcium carbonate or titanium dioxide can be incorporated in the adhesive, or alternately, a second clay coat can be applied to the undersurface of the paper prior to bonding the paper to the substrate. Alternatively, a paper coating on both sides may be used. It is unnecessary to add pigment if kraft paper is used instead of publication paper.

After application of the printed paper to the cellulosic substrate, the laminated product is then die cut into a plurality of sections or segments of desired shape, and each section is then folded and glued to form the configuration of a box. The boxes, in flat folded shape, are shipped to the manufacturer of the product, the boxes are then opened, the product inserted, and the end flaps are then glued or secured to provide the final packaged product for distribution.

The invention economically provides enhanced graphics and an enhanced interior for paperboard packaging by use of high speed printing on publication or kraft paper, which is then bonded to the cellulosic substrate through an adhesive. The final product has enhanced stiffness and strength, and is environmentally friendly.

DESCRIPTION OF THE PREFERRED EMBODIMENTS

Figure 3:
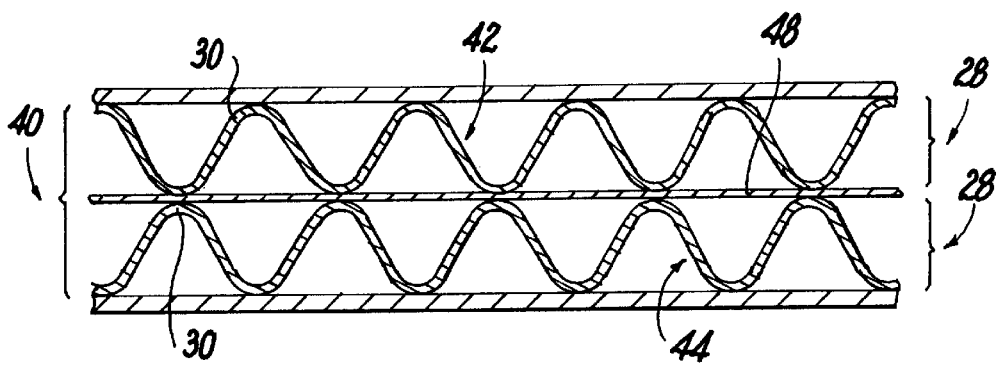
FIG. 3 is a cross-sectional view of a third embodiment of the laminate wherein a core comprised of multiple layers of fluted corrugating medium has a first and second decorative layer respectively attached thereto.
Figure 4:
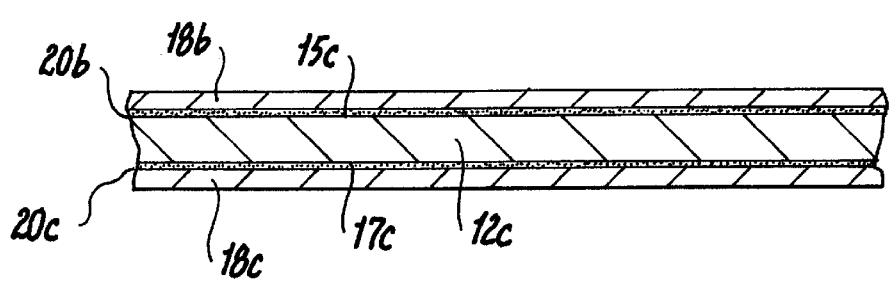
FIG. 4 is a cross-sectional view of a fourth embodiment of the laminate wherein the base layer has outer layers adhesively attached to each surface.
Figure 5:
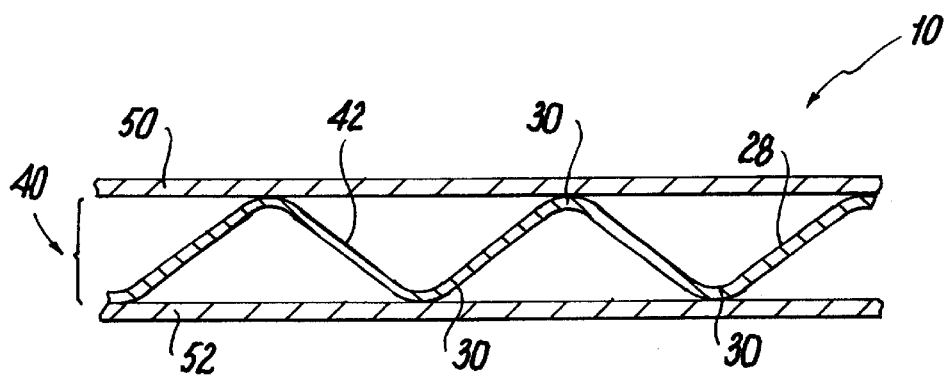
FIG. 5 is a cross-sectional view of the laminate shown in FIG. 3 illustrating a fifth embodiment where the core is comprised of a single layer of fluted corrugating medium.

As shown in FIG. 1, the invention is generally directed to a laminated printed package consisting of a cellulosic, fiberboard base layer 12 having an outer layer 18. Outer layer 18 preferably consists of a sheet of paper printed with graphics. Outer layer 18 is then bonded to the outer surface 17 of the base layer 12 through use of an adhesive 20. In a second embodiment as shown in FIG. 4, each surface of base layer 12c may have layers 18b and 18c applied thereto with an adhesive 20b and 20c, respectively. In yet another embodiment as shown in FIGS. 3 and 5, rather than a single base layer, there exists a core 40 of single- or multi-wall corrugating medium.

In specific reference to FIG. 1, the outer layer 18 to be used in the invention, is preferably clay-coated publication paper which has a thickness generally in the range of 0.00075 to 0.00950 inches. More particularly, the paper can consist of clay-coated ground wood paper produced with mechanically pulped fibers. Alternatively, uncoated free sheet or clay-coated free sheet paper produced by chemical pulping operations with no or very little mechanical pulp fibers, super-calendared paper, or clay-coated kraft paper may be used. These papers may include recycled fiber content.

The paper outer layer 18 in coiled form is unwound and printed by conventional techniques, preferably by high speed, offset printing, operating at a speed generally in the range of 1500 to 3200 ft. per minute. Alternately, high speed rotogravure or flexo printing can be utilized to print the graphics on the clay-coated or smooth surface of the paper. Unless lamination is performed in an in-line process, after printing, the paper is rewound into coiled form and stored for subsequent application to a fiberboard base layer 12 at the location of the box manufacturer.

The cellulosic fiberboard base layer 12 can be produced by conventional procedures. Preferably, the base layer 12 is produced on a cylinder or fourdrinier machine which has the capability of producing multi-ply fiberboard.

Figure 6:
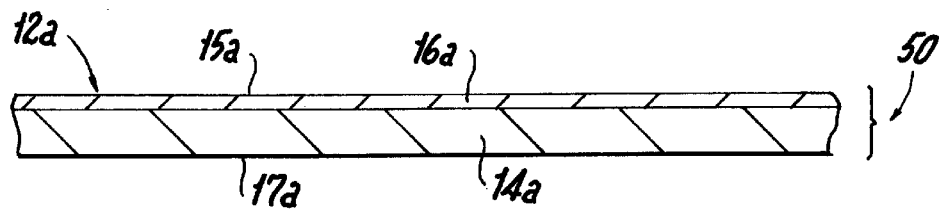
FIG. 6 is an enlarged view of layer 50 as depicted in FIG. 5.
Figure 7:
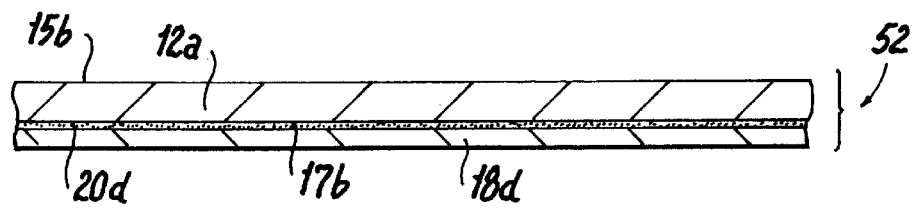
FIG. 7 is an enlarged view of layer 52 as depicted in FIG. 5.
Figure 8:
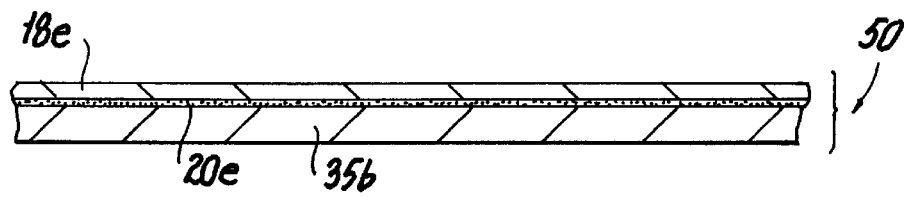
FIG. 8 is an enlarged view of an alternative embodiment of layer 50 as depicted in FIG. 5.

Referring to FIGS. 3 and 5–8, it is contemplated that the laminated composite sheet 10 may take the form of a single- or multi-wall corrugated product using known corrugating processes. In this alternative embodiment, at least one layer of fluted corrugating medium 28 forms a core 40. First and second decorative layers 50, 52 are respectively attached to each fluted surface 42, 44 of core 40. When core 40 consists of more than one fluted layer of medium 28, each layer is separated with a sheet or layer of kraft linerboard 48. Shown in FIGS. 5 and 6 is a first decorative layer 50 of multi-ply fiberboard. Layer 50 is comprised of a base ply 14a consisting of unbleached, virgin or recycled cellulosic fibers, and an inner ply 16a consisting of dyed or bleached, virgin or recycled fibers. Layer 50 is adhesively attached to fluted surface 42 at flute tips 30 such that the inner ply 16a remains visible. Referring to FIG. 8, it is further contemplated that the first decorative layer 50 of multi-ply fiberboard may instead consist of a base layer 35b of unbleached, virgin or recycled cellulosic fibers, adhesively attached to a paper layer 18e using a separate adhesive layer 20e. The layer 50 is then adhesively attached to the surface 42 at flute tips 30 such that layer 18e remains visible. Referring to FIG. 7, a second decorative layer 52 consists of kraft linerboard 12b with an outer layer 18d of publication-grade paper adhesively attached thereto using a separate layer of adhesive 20d. The layer 52 is adhesively attached to the remaining core surface 44 such that the publication-grade paper remains visible. Further, each decorative layer may be prepared for printing and/or made water or oil proof, or water or oil resistant by the materials and methods described herein.

As shown in FIG. 1, when only one surface of base layer 12 is laminated, it consists of at least two plies, base ply 14 and inner ply 16. Inner ply 16 of base layer 12 may be comprised of: bleached or colored recycled pulp produced from old corrugated containers, newsprint, white office waste, and the like; or mixtures of bleached or colored virgin pulp and recycled pulp. In the alternative embodiment shown in FIG. 4, when both surfaces of base layer 12c are laminated, base layer 12c need only be comprised of one base ply made from unbleached fibers. There is no inner ply. The base ply of the base layers 12 or 12c may be comprised of: unbleached virgin Kraft pulp; recycled pulp produced from old corrugated containers, newsprint, white office waste paper, and the like; or mixtures of virgin pulp and recycled pulp.

For embodiments having an inner ply as shown in FIGS. 1 and 6, the base layers 12 or 12a have a basis weight of 25 lbs. to 90 lbs. per 1,000 sq. ft., and a thickness of 0.009 to 0.035 inches. Thus, base ply 14 or 14a has a thickness range of 0.008 to 0.034, the preferred range being 0.009 to 0.025. The inner ply 16 or 16a has a thickness range of 0.001 to 0.005, the preferred range being 0.0015 to 0.004.

When producing containers where high stiffness and tear strength is required in the laminated product, long fiber, virgin soft wood pulp is preferred as the base layer of the substrate. When producing a laminated product that is designed to contain products of lesser weight, such as cracker, facial tissue or clothing boxes, the base layer can be formed of plies of recycled pulp produced from old corrugated cartons, newsprint, office waste, and the like.

For each described embodiment, when the corresponding laminated composite sheet 10 is folded into the configuration of a box, there will be a specific surface that will be located at the interior. For example. inner ply 16 or 16a, and layer 18e or 18b are each folded so that they are located at the box interior. In applications where the interior of a box is not visible or shaded from such light, it is preferable to use an inner ply or layer comprised from high contents mechanical or recycled fibers. Such fibers are relatively inexpensive, but may yellow when exposed to light because of their high lignin contents. However, if not exposed to light, such yellowing will not occur. Mechanical or recycled fibers may be obtained from newsprint, uncoated groundwood or recycled printing papers, or clay-coated groundwood printing paper.

When producing a high strength container, the base ply 14, 14a or base layer 12a or 12c of the various embodiments may be produced by a typical Kraft process. In the Kraft process, wood chips are cooked at a temperature of approximately 340° F. with the addition of sodium hydroxide and sodium hydrosulfide (conventional Kraft white liquor) for a period of about 60 to 120 minutes to dissolve the lignin and hemi-cellulose. After cooking, the pulp is washed which acts to remove up to 98% of the treating chemicals. The pulp is then diluted with water to a solids content of about 4% and treated with sulfuric acid and alum to obtain the desired pH. If a fourdrinier machine is used, the pulp stock is then delivered to the headbox of the forming section of the papermaking machine, and the pulp slurry is fed from the headbox onto the forming fabric or wire to provide a pulp mat.

The pulp for any additional ply, or a bleached pulp ply such as inner ply 16, is fed from a second headbox located downstream of the first headbox onto the base ply 14 to provide the composite structure in a conventional manner.

Preferably, the bleached pulps employed in the various embodiments are produced using environmentally friendly bleaching process which does not use elemental chlorine. Such processes are well known in the art of bleaching pulp, and generally use oxygen, ozone and chlorine dioxide.

On the wire containing the pulp mat or web, water is removed from the web by both gravity and mechanical induced vacuum, and the partially dewatered web then passes through the press section and drying section of the papermaking machine, in a conventional manner, to produce the dry cellulosic substrate, such as base layer 12.

When producing paperboard packaging, such as a low-strength cracker box, either the fiberboard base layer 12, or the base ply 14 will generally consist of multiple plies of recycled fibers. The pulping of the recycled fibers is carried out in a conventional manner, in which the recycled cellulosic waste is mixed with water and chemical dispersants, such as sodium hydroxide. The mixture is then subjected to a shear type of pulping agitation to break down the cellulosic waste into individual fibers and to liberate inks and toners. During pulping the dispersant chemicals act to dissociate the ink from the fibers, and disperse the ink particles in the aqueous pulp slurry. Following the dispersion, the pulp can then be subjected to conventional ink removal operations, which can be accomplished either by froth floatation or dilution washing.

When utilizing virgin unbleached Kraft pulp, base ply 14 will be brown in color, thus, the thickness or number of plies in inner ply 16 of base layer 12 will be dependent upon the desired color or brightness of inner ply 16.

Referring to FIG. 1, at the site of the box manufacturer, the printed paper outer layer 18 is uncoiled, and continuously bonded to the base layer 12 with an adhesive 20.

In the alternative embodiment, as shown in FIG. 4, both inner and outer surfaces 15c and 17c of the base layer 12c are laminated. In this alternative embodiment, a second roll of paper at the site of the box manufacturer is uncoiled and continuously bonded to the inner surface 15c of the base layer 12c. It is contemplated that the bonding of the two laminates (the outer layer 18c and second outer layer 18b) to the base layer 12c can be performed on the same piece of laminating equipment.

The adhesive used in all embodiments, namely adhesives 20 and 20b–20e, to continuously laminate both outer layer and second laminate to the base layer may take the form of a wet-bond or dry-bond laminating adhesive, polyethylene, hot melt or hydrolyzed starch. The laminating adhesive could be water, solvent or solventless based. The type of adhesive used varies with the specification requirements of the end product. The adhesive is also used to glue flute tips 30 to the kraft linerboard layer 48 and decorative layers 50 and 52.

Depending on the package application, the cellulosic substrate will be comprised of a continuous sheet of fiberboard, or discontinuous sheets of single- or multiple-wall corrugated board. Typically, in the laminating process, continuous sheets of substrate are completely and continuously bonded to a moving sheet of printed paper. In practice, the wet-bond or dry-bond laminating adhesive is preferably applied in a conventional laminating process. This typically involves applying the laminating adhesive to the undersurface of the paper by gravure and impression rollers and a doctor blade, with heat applied either before or after the nip pressure of the rollers is applied to the printed paper and base layer if the adhesive is a solvent or water base. Heat is not required for solventless laminating adhesives. Alternately, a polyethylene adhesive can be applied through a conventional process I which polyethylene is extruded onto the printed paper or substrate for purposes of bonding.

In the embodiments that employ a fiberboard substrate such as base layer 12, adhesive 20 is applied to the undersurface 19 of outer layer 18, and then applied to outer surface 17 of base layer 12 to create a laminated product. Similarly, in the embodiment wherein both surfaces of the base layer 12c are laminated, adhesive-coated outer layers 18b and 18c are applied to both the inner and outer surfaces 15c and 17c of the base layer 12c. Regardless of which embodiment is used, the laminated product is then passed through compression rolls to firmly bond the outer layers to the base layer.

Regardless of the specific embodiment, outer layers extend over the entire surface area of the base layer. The laminated product is then die cut into a plurality of sections or segments of the desired shape or configuration. Each section is then folded and glued to form an openended box-like structure, having a white, colored or laminated interior and paper laminate exterior. The flat boxes are then shipped to product manufacturers. At the site of the product manufacturer, the flat boxes are opened, a product inserted, and the end flaps are then glued.

In certain instances when dealing with certain food products, moist or oily products may be introduced into the laminated box. Subsequently, the moisture or oil may migrate to the box exterior and cause warping, disfiguration or staining of the laminated box. To overcome a moisture or oil problem, a moisture or oil blocking coating or film (not shown) is applied respectively to the various embodiments at inner ply 16, 18b, 16a or 18e of the laminated sheet 10 prior to cutting and folding. For example, it is contemplated that in certain instances, a layer of wax or film of low density polyethylene can be applied to the inner face 16 of the cellulosic base layer 12. This water and oil resistant film will prevent migration of such substances through the laminated package to aid in minimizing any warpage, disfigurement or staining of the package. Additional protection may be provided through the use of an adhesive 20 that is either water or oil resistant, or water or oil proof. In the embodiment wherein both surfaces of the base layer 12c are laminated, the second outer layer 18b could consist of paper having oil or moisture blocking characteristics.

Figure 2:
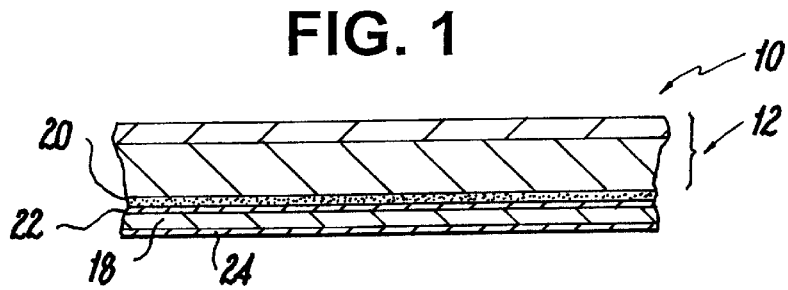
FIG. 2 is a cross-sectional view of the laminate of FIG. 1 illustrating a second embodiment which includes a clay coating on each surface of the outer layer.

Referring to FIG. 2, the publication paper used for outer layer 12 tends to be translucent because it is relatively thin and generally comprised of bleached, chemically pulped fibers. Similarly, the layer of adhesive 20 may be translucent, with the result that there may be "show-through" of the dark colored base ply 14 which could detract from the appearance of the printed graphics (not shown). To prevent "show-through," finely divided particles (not shown) of a generally inert pigment, such as calcium carbonate, titanium dioxide, or the like, can be incorporated with the adhesive 20. Show-through can also be prevented by applying clay coating(s) to the outer layer 18. Specifically, a first clay coating 24 may be applied between the outer layer surface and printed graphics (not shown). Alternately or additionally, a second clay coating 22 may be applied to the undersurface of the outer layer 18, the undersurface being the surface of the paper adjacent the base ply 14. These constructions will prevent "show-through" of dark colored base ply 14 and maintain the fine resolution of the graphics.

To protect the laminated outer layer 12, a protective overcoat (not shown) of varnish or the like may be applied. Such a coating will prevent scuffing and depending on the overcoat used, will increase or decrease surface friction.

The invention combines the strength of the publishing business with the need for enhanced graphics in packaging having a bleached, colored, printed or laminated interior, by laminating printed rolls of paper to a heavier weight cellulosic substrate, immediately preceding the die cutting, folding and gluing process.

I claim:

1. A carton comprising a laminated composite sheet folded and glued in the configuration of a box, said sheet comprising:

a fiberboard base layer, said base layer comprised of at least one base ply of unbleached cellulosic fibers selected from the group consisting of unbleached virgin kraft pulp and recycled pulp, said base ply having an inner surface and an outer surface;

at least one inner ply of cellulosic fibers on the inner surface of said base layer selected from the group consisting of dyed virgin pulp, dyed recycled pulp, bleached virgin pulp and bleached recycled pulp;

an outer layer with printed graphics thereon; and a separate layer of adhesive disposed between said base layer and said outer layer serving to bond the outer layer to the base layer, the outer layer being bonded continuously to the outer surface of said base layer.

2. The carton of claim 1, further including a clay coating disposed between said outer layer and said printed graphics.

3. The carton of claim 2, further including a second clay coating between said outer layer and said layer of adhesive.

4. The carton of claim 1, further including a protective coating disposed on the printed graphics.

5. The carton of claim 1, further including finely divided particles of a white-colored pigment admixed with said adhesive to prevent said base layer from showing through said outer layer.

6. The carton of claim 5, wherein said pigment is selected from the group consisting of calcium carbonate, titanium dioxide and mixtures thereof.

7. The carton of claim 1, further including a layer of material disposed on said inner ply, said layer of material selected from the group consisting of waterproof, water resistant, oil proof, and oil resistant substance.

8. The carton of claim 1, wherein said inner ply has an exposed outer face, and further including a printed graphics disposed on said face.

9. The carton of claim 1, wherein the outer layer is composed of paper selected from the group consisting of unbleached kraft paper, unbleached recycled paper and bleached publication-grade paper.

10. The carton of claim 1, wherein the outer layer is composed of film.

11. The carton of claim 1, wherein the outer layer is composed of foil.

12. A carton comprising a laminated composite sheet folded and glued in a configuration of a box, said sheet comprising:

a multi-ply fiberboard with an inner and outer surface, said fiberboard comprised of a base ply of unbleached cellulosic fibers selected from the group consisting of unbleached virgin kraft pulp, and an inner ply made from cellulosic fibers selected from the group consisting of dyed virgin pulp, dyed recycled pulp, bleached virgin pulp, and bleached recycled pulp;

a layer of fluted, cellulosic corrugating medium with a first and second plane of flute tips, said first plane of tips adhesively connected to the outer surface of said fiberboard so that the inner ply remains exposed;

a sheet of kraft linerboard having an inner and outer surface, said linerboard inner surface adhesively connected to said second plane of flute tips;

an outer layer with printed graphics thereon; and a separate layer of adhesive disposed between said outer surface of the linerboard and said adhesive layer, serving to continuously bond the linerboard to the outer layer.

13. A carton comprising a laminated composite sheet folded and glued in the configuration of a box, said sheet composed of:

a core, having a first surface and a second surface, comprised of a plurality of layers of fluted, cellulosic corrugating medium, said layers squarely stacked upon each other, each layer separated by a kraft linerboard layer, said linerboard layer adhesively connecting each fluted layer at the flute tips;

a multi-ply fiberboard with an inner and outer surface, said fiberboard comprised of a base ply of unbleached cellulosic fibers selected from the group consisting of unbleached virgin kraft pulp and recycled pulp, and an inner ply of cellulosic fibers selected from the group consisting of dyed virgin pulp, dyed recycled pulp, bleached virgin pulp and bleached recycled pulp, said fiberboard inner surface adhesively connected to the flute tips at said first surface of said core such that the inner ply remains visible;

a sheet of kraft linerboard, having an inner and outer surface, said linerboard sheet inner surface adhesively connected to said flute tips at the second surface of said core;

an outer layer with printed graphics thereon;

a separate layer of adhesive disposed between outer surface of the linerboard and said adhesive layer, serving to continuously bond the linerboard to the outer layer.

14. A carton comprising a laminated composite sheet folded and glued in a configuration of a box, said sheet comprising:

a first layer;

a second layer;

a core with a first core surface and second core surface, said first layer adhesively attached to the first core surface and said second layer adhesively attached to the second core surface;

the first layer is comprised of a multi-ply fiberboard with an inner and outer surface, said fiberboard comprised of a base ply of unbleached cellulosic fiber selected from the group consisting of unbleached virgin Kraft pulp, and an inner ply made from cellulosic fibers selected from the group consisting of dyed virgin pulp, dyed recycled pulp, bleached virgin pulp, and bleached recycled pulp, and said multi-ply fiberboard is adhesively attached to said core such that the inner ply remains exposed.

15. The carton of claim 14, further including printed graphics disposed on the inner ply.

16. The carton of claim 14, further including a layer of material disposed on said inner ply, said layer of material selected from the group consisting of waterproof, water resistant, oil proof, and oil resistant substance.

17. A carton comprising a laminated composite sheet folded and glued in a configuration of a box, said sheet comprising:

a first layer;

a second layer;

a core with a first core surface and second core surface, said first layer adhesively attached to the first core surface and said second layer adhesively attached to the second core surface;

the first layer is comprised of:

a Kraft linerboard;

a first outer layer; and a separate layer of adhesive disposed between, and to provide a bond between, said first layer and said first outer layer, said bond being continuous.

18. The carton of claim 17, further including printed graphics disposed on the first outer layer.

19. The carton of claim 18, further including a protective coating disposed on the printed graphics.

20. The carton of claim 18, further including a first clay coating disposed between said first outer layer and said printed graphics.

21. The carton of claim 20, further including a second clay coating between said first outer layer and said layer of adhesive.

22. The carton of claim 18, further including finely divided particles of light colored pigment mixed with said adhesive to prevent said kraft linerboard from showing through to said first outer layer.

23. The carton of claim 22, wherein said pigment is selected from the group consisting of calcium carbonate, titanium dioxide and mixtures thereof.

24. A carton comprising a laminated composite sheet folded and glued in a configuration of a box, said sheet comprising:

a first layer;

a second layer;

a core with a first core surface and second core surface. said first layer adhesively attached to the first core surface and said second layer adhesively attached to the second core surface;

the first layer is comprised of paper selected from the group consisting of waterproof, water-resistant, oil proof and oil resistant paper.

25. A carton comprising a laminated composite sheet folded and glued in a configuration of a box, said sheet comprising;

a first layer;

a second layer;

a core with a first core surface and second core surface, said first layer adhesively attached to the first core surface and said second layer adhesively attached to the second core surface;

said second layer comprises:

a fiberboard base layer comprised of cellulosic fibers selected from the group consisting of unbleached virgin Kraft pulp and recycled pulp, said base layer having an inner surface and an outer surface;

a second outer layer with printed graphics thereon; and a separate layer of adhesive disposed between said base layer and said second outer layer serving to bond the second outer layer to the base layer, the outer layer being bonded continuously to the outer surface of said base layer.

26. The carton of claim 25, further including a clay coating disposed on said second outer layer, with said printed graphics disposed thereon.

27. The carton of claim 26, further including a second clay coating between said second outer layer and said layer of adhesive.

28. The carton of claim 25, further including a protective coating disposed on the printed graphics.

29. The carton of claim 25, further including finely divided particles of a white-colored pigment admixed with said adhesive to prevent said base layer from showing through said second outer layer.

30. The carton of claim 29, wherein said pigment is selected from the group consisting of calcium carbonate, titanium dioxide and mixtures thereof.

31. A carton comprising a laminated composite sheet folded and glued in a configuration of a box, said sheet comprising:

a first layer;

a second layer;

a core with a first core surface and second core surface, said first layer adhesively attached to the first core surface and said second layer adhesively attached to the second core surface;

said core is comprised of:
a plurality of fluted layers of cellulosic corrugating medium, said layers squarely stacked upon each other, each layer separated by a Kraft linerboard sheet, said linerboard sheet adhesively connecting each fluted layer at the flute tips, and said first and second layers are respectively attached to first and second core surfaces at the flute tips.

32. In a method of producing a laminated package, the steps comprising producing a multi-ply base layer of cellulosic fibers composed of a base ply and an inner ply, producing a sheet of paper having a clay coating on an outer surface thereof, printing graphics on the clay coated first surface of said paper sheet, continuously applying the printed paper sheet to an outer surface of said base layer, applying adhesive between contiguous surfaces of said base layer and said printed paper sheet to provide a continuous bond of the printed paper to the base layer to provide a laminated structure.

33. The method of claim 32, and further including the steps of cutting the laminated structure into segments, and forming each segment into the configuration of a box with said printed paper sheet constituting an outer face of the box.

34. The method of claim 32, wherein said base ply is selected from the group consisting of unbleached virgin kraft and recycled pulp.

35. The method of claim 32, wherein said inner ply is selected from group consisting of bleached virgin pulp and bleached recycled pulp.

36. The method of claim 32, wherein said adhesive is selected from the group consisting of wet-bond laminating adhesive, dry-bond laminating adhesive, polyethylene, hot melt or hydrolyzed starch.

37. The method of claim 32, and further including the step of incorporating a white-colored generally inert pigment with said adhesive.

38. The method of claim 32, wherein the paper sheet also has an inner surface, and further including the step of applying a clay coating to the inner surface of said paper sheet prior to bonding the paper sheet to said base layer.

39. The method of claim 32, wherein the inner ply has an exposed outer surface, and further including the step of applying a water resistant coating to the exposed outer surface of said inner ply.

40. A carton comprising a laminated composite sheet folded and glued in the configuration of a box, said sheet comprising:

a fiberboard base layer, said base layer comprised of unbleached cellulosic fibers selected from the group consisting of unbleached virgin kraft pulp and recycled pulp, said base layer having an inner surface and an outer surface;

a first outer layer with first printed graphics thereon;

a separate first adhesive layer disposed between the outer surface of said base layer and said outer layer serving to bond the first outer layer to the base layer, the first outer layer being bonded continuously to the outer surface of said base layer;

a second outer layer; and a separate second adhesive layer disposed between the inner surface of said base layer and said second outer layer serving to bond the second outer layer to the base layer, the outer layer being bonded continuously to the inner surface of said base layer.

41. The carton of claim 40, further including a clay coating disposed between said first outer layer and said printed graphics.

42. The carton of claim 41, further including a second clay coating between said first outer layer and said first adhesive layer.

43. The carton of claim 40, further including a protective coating disposed on the printed graphics.

44. The carton of claim 40, further including a second printed graphics disposed on the second outer layer.

45. The carton of claim 40, further including finely divided particles of a white-colored pigment admixed with said first adhesive layer to prevent said base layer from showing through said first outer layer.

46. The carton of claim 45, wherein said pigment is selected from the group consisting of calcium carbonate, titanium dioxide and mixtures thereof.

47. The carton of claim 40, further including a layer of material disposed on said inner surface of said second outer layer selected from the group consisting of waterproof, water resistant, oil proof, and oil resistant substance.

48. The carton of claim 40 wherein the second outer layer is selected from the group consisting of waterproof, water resistant, oil proof, and oil resistant paper.

49. The carton of claim 40, wherein the first outer layer is composed of paper selected from the group consisting of unbleached kraft paper, unbleached recycled paper and bleached publication-grade paper.

* * * * *